US008985464B2

(12) United States Patent  (10) Patent No.: US 8,985,464 B2
Tovar et al.  (45) Date of Patent: Mar. 24, 2015

(54) PAYMENT CARD STORAGE APPARATUS AND TAB MANAGEMENT SYSTEM

(71) Applicants: Carlos Tovar, San Jose, CA (US); Francois Pierre deVilliers, San Jose, CA (US); George Newman Alexy, San Jose, CA (US)

(72) Inventors: Carlos Tovar, San Jose, CA (US); Francois Pierre deVilliers, San Jose, CA (US); George Newman Alexy, San Jose, CA (US)

( * ) Notice: Subject to any disclaimer, the term of this patent is extended or adjusted under 35 U.S.C. 154(b) by 34 days.

(21) Appl. No.: 13/829,901

(22) Filed: Mar. 14, 2013

(65) Prior Publication Data

US 2014/0097241 A1  Apr. 10, 2014

Related U.S. Application Data

(60) Provisional application No. 61/710,855, filed on Oct. 8, 2012.

(51) Int. Cl.
*G06K 7/00* (2006.01)
*G06Q 20/34* (2012.01)
*G06Q 20/36* (2012.01)
*G07F 7/08* (2006.01)

(52) U.S. Cl.
CPC ............ *G06Q 20/34* (2013.01); *G06Q 20/3676* (2013.01); *G07F 7/088* (2013.01)
USPC ........... 235/486; 235/449; 235/383; 235/384; 235/380; 235/381

(58) Field of Classification Search
USPC .......................... 235/380, 381, 383, 449, 384
See application file for complete search history.

(56) References Cited

U.S. PATENT DOCUMENTS

| | | | |
|---|---|---|---|
| 4,806,744 A | 2/1989 | Briane et al. | |
| 5,262,938 A | 11/1993 | Rapoport et al. | |
| 5,515,031 A | 5/1996 | Pereira et al. | |
| 5,602,730 A | 2/1997 | Coleman et al. | |
| 5,845,263 A | 12/1998 | Camaisa et al. | |
| 6,011,550 A | 1/2000 | Capps et al. | |
| 7,110,964 B2 | 9/2006 | Tengler et al. | |
| 7,213,755 B2 * | 5/2007 | Newsome et al. | 235/384 |

OTHER PUBLICATIONS

Barker, Philip G., Computer control of a random access slide projector, Microprocessing and Microprogramming vol. 10, Nov. 1982, p. 261-271.

* cited by examiner

*Primary Examiner* — Kristy A Haupt

(57) ABSTRACT

A system for managing bar or restaurant tabs includes a payment card storage apparatus, such as a carousel, to receive and store payment cards under computer control, and a payment card reader to read identifying information from the payment cards that are to be stored in the payment card storage apparatus. The system permits a server to conveniently receive and store a payment card to secure a patron's tab, and then return it to the patron at the time the tab is closed and paid out. An associated point-of-sale system displays tab information and a list of names of those patrons having open tabs. A particular patron's card can be returned from the payment card storage apparatus by selecting the patron's tab from the list. The system may further be applied in any situation in which a debt or obligation can be secured by the possession of a personally-identifiable token that has, holds or permits access to value.

18 Claims, 15 Drawing Sheets

| Open Tabs | Current Order | Menu Items | |
|---|---|---|---|
| Jim Abel | | Beer | Wine |
| Pam James | | Cocktails | Soda |
| Jane Jones | TOUCH A MENU ITEM TO START A NEW ORDER OR TOUCH A TAB TO ADD TO OR CASH OUT THAT TAB | Coffee/Tea | Snacks |
| William Walsh | | Starters | Salads |
| Justin Zachary | | Main Courses | Desserts |

1305 — Open Tabs
1310 — Current Order
1315 — Menu Items

FIG. 13

| Open Tabs | | Current Order | | Menu Items | |
|---|---|---|---|---|---|
| Jim Abel | | #23416 | | Beer | Wine |
| Pam James | | | | | |
| Jane Jones | | 1 X Margarita | $ 8.00 ⊠ | Cocktails | Soda |
| William Walsh | | 2 X Sierra Nevada | $ 10.00 ⊠ | | |
| Justin Zachary | | 1 X Chips & Salsa | $ 3.00 ⊠ | Coffee/Tea | Snacks |
| | | 1 X Guacamole | $ 2.50 ⊠ | | |
| | | | | Starters | Salads |
| | | | | Main Courses | Desserts |
| | | Subtotal | $ 23.50 | | |
| | | Tax | $ 2.00 | | |
| | | Total | $ 25.50 | | |
| | | Start New Tab | Add to Open Tab | Submit & Cash Out | |

1305 → Open Tabs; 1310 → Current Order; 1315 → Menu Items

FIG. 14

| Open Tabs | Current Tab | | Menu Items | |
|---|---|---|---|---|
| A | Jane Jones | | | |
| B Jim Abel | | | Beer | Wine |
| Pam James | | | | |
| C Jane Jones | 1 X Btl Plonk de Noir | $ 15.00 | | |
| D William Walsh | 2 X Sierra Nevada | $ 10.00 | Cocktails | Soda |
| E Justin Zachary | 1 X Margarita | $ 8.00 ☒ | | |
| F | 2 X Sierra Nevada | $ 10.00 ☒ | | |
| G | 1 X Chips & Salsa | $ 3.00 ☒ | Coffee/Tea | Snacks |
| H | 1 X Guacamole | $ 2.50 ☒ | | |
| I | | | | |
| J | | | Starters | Salads |
| K | | | | |
| L | | | | |
| M | | | Main Courses | Desserts |
| N | | | | |
| O | | | | |
| P | | | | |
| Q | Subtotal | $ 48.50 | | |
| R | Tax | $ 4.12 | | |
| S | Total | $ 52.62 | | |
| T | | | | |
| U | Done | Cash Out | | |
| V | | | | |

1305 — Open Tabs; 1310 — Current Tab; 1315 — Menu Items

FIG. 15

| Open Tabs | Current Order | Menu Items | |
|---|---|---|---|
| Jim Abel | #23416 | Beer | Wine |
| Pam James | 1 X Margarita  $ 8.00 | | Soda |
| Jane Jones | 2 X Sierra Nevada  $10.00 | Cocktails | |
| William Walsh | INSERT PAYMENT CARD INTO TAB MANAGEMENT SYSTEM | Coffee/Tea | Snacks |
| Justin Zachary | Cancel | Starters | Salads |
| | | Main Courses | Desserts |
| | Subtotal  $23.50 | | |
| | Tax  $ 2.00 | | |
| | Total  $25.50 | | |
| | Start New Tab   Add to Open Tab   Submit & Cash Out | | |

FIG. 16

| Open Tabs | Current Order | Menu Items | |
|---|---|---|---|
| Jim Abel<br>Pam James<br>Jane Jones<br>William Walsh<br>Justin Zachary | #23416<br><br>1 X Margarita $ 8.00<br>2 X Sierra Nevada $ 10.00<br><br>Start Tab in the Name of:<br>STEVEN PERKINS?<br>[Confirm] [Return Card]<br><br>Subtotal $ 23.50<br>Tax $ 2.00<br>Total $ 25.50<br><br>[Start New Tab] [Add to Open Tab] [Submit & Cash Out] | Beer | Wine |
| | | Cocktails | Soda |
| | | Coffee/Tea | Snacks |
| | | Starters | Salads |
| | | Main Courses | Desserts |

1305 — Open Tabs
1310 — Current Order
1315 — Menu Items

FIG. 17

| Open Tabs | Current Tab | | Menu Items | |
|---|---|---|---|---|
| Jim Abel<br>Pam James<br>Jane Jones<br>Steven Perkins<br>William Walsh<br>Justin Zachary | Steven Perkins<br><br>1 X Margarita　　　　$ 8.00　☒<br>2 X Sierra Nevada　$ 10.00　☒<br>1 X Chips & Salsa　$ 3.00　☒<br>1 X Guacamole　　 $ 2.50　☒<br><br><br><br>Subtotal　　$ 23.50<br>Tax　　　　$ 2.00<br>Total　　　$ 25.50<br><br>[ Done ]　　[ Cash Out ] | | Beer<br><br>Cocktails<br><br>Coffee/Tea<br><br>Starters<br><br>Main Courses | Wine<br><br>Soda<br><br>Snacks<br><br>Salads<br><br>Desserts |

1305 — Open Tabs list (A–Z)
1310 — Current Tab
1315 — Menu Items

FIG. 18

| Open Tabs | Current Tab | Menu Items | |
|---|---|---|---|
| A Jim Abel<br>B Pam James<br>C Jane Jones<br>D Steven Perkins<br>E William Walsh<br>F Justin Zachary<br>G<br>H<br>I<br>J<br>K<br>L<br>M<br>N<br>O<br>P<br>Q<br>R<br>S<br>T<br>U<br>V<br>W<br>X<br>Y<br>Z | Steven Perkins<br><br>1 X Margarita        $ 8.00<br>2 X Sierra Nevada    $10.00<br><br>REMOVE CARD FROM<br>TAB MANAGEMENT SYSTEM<br><br>Cancel<br><br>Subtotal    $23.50<br>Tax         $ 2.00<br>Total       $25.50<br><br>Done         Cash Out | Beer | Wine |
| | | Cocktails | Soda |
| | | Coffee/Tea | Snacks |
| | | Starters | Salads |
| | | Main Courses | Desserts |

1305 — Open Tabs; 1310 — Current Tab; 1315 — Menu Items

FIG. 19

| Open Tabs | Current Tab | | Menu Items | |
|---|---|---|---|---|
| Jim Abel | Steven Perkins | | Beer | Wine |
| Pam James | | | | |
| Jane Jones | 1 X Margarita | $ 8.00 ☒ | Cocktails | Soda |
| Steven Perkins | 2 X Sierra Nevada | $ 10.00 ☒ | | |
| William Walsh | 1 X Chips & Salsa | $ 3.00 ☒ | Coffee/Tea | Snacks |
| Justin Zachary | 1 X Guacamole | $ 2.50 ☒ | | |
| | | | Starters | Salads |
| | Pay with Tab Card / Pay with Other Card / Pay with Cash | | | |
| | | | Main Courses | Desserts |
| | Subtotal | $ 23.50 | | |
| | Tax | $ 2.00 | | |
| | Total | $ 25.50 | | |

1305 → Open Tabs; 1310 → Current Tab; 1315 → Menu Items

FIG. 20

PAYMENT CARD STORAGE APPARATUS AND TAB MANAGEMENT SYSTEM

RELATED APPLICATION DATA

This application claims the benefit of U.S. Provisional Patent Application Ser. No. 61/710,855 filed on Oct. 8, 2012, the contents of which are incorporated herein as if specifically set forth.

BACKGROUND OF THE INVENTION

In establishments such as restaurants and bars, it is common practice to permit patrons to "open a tab" for the period of time that the patron is present. In such a case, the patron is permitted to repeatedly order or purchase additional items without having to pay for each additional item or set of items as a separate transaction. The newly-ordered items are "added to the tab" until the tab is "closed out" when the patron has placed a final order or is ready to leave the establishment. All of the purchased items are then totaled up on a single bill and the patron pays it in one single transaction.

The use of tabs is convenient for both the patron and the establishment, but there is a risk to the establishment that the patron will leave without paying. To secure payment of the tab, establishments often request a payment card (typically a credit card but also possibly a debit card, prepaid card or other type of electronic payment token) from the patron, which is then held by the establishment until the tab is closed out. Payment can then be made either using the payment card that has been held by the establishment or by some other means such as cash or a different payment card, and the payment card that has been held by the establishment is then returned to the patron.

SUMMARY OF THE INVENTION

According to one aspect of the invention, a payment card storage system comprises a payment card storage apparatus to receive and store payment cards under computer control; and a payment card reader to read identifying information from the payment cards that are to be stored by the payment card storage apparatus.

The payment card storage system may comprise a transfer mechanism to transfer the payment cards to and from the payment card storage apparatus.

The payment card reader may be co-located with the payment card storage apparatus in which case the transfer mechanism moves the payment cards past or through the payment card reader.

The payment card storage system may further comprise a computer processor to execute instructions for operating the point of sale system and a display to present transaction information to a user of the system.

In use, the transaction information shown by the display may include a user-selectable option of starting a tab and storing a specific payment card in the payment card storage apparatus. After selection of the option to store the specific payment card in the payment card storage apparatus, identifying information may be read from the specific payment card by the card reader apparatus and the specific payment card may then be associated with a list of one or more specific items ordered by a specific patron. The identifying information read from the specific payment card may include the name of the specific patron, which is shown on the display when the specific patron's list of items is displayed by the display. A user of the system may select to return the specific payment card or add more items to the when the list of items is displayed by the display. The identifying information read from the specific payment card may include the name of the specific patron, and the system may display a list or index of names of the patrons whose cards are stored in the payment card storage system.

The payment card storage system may further comprise one or more sensors for detecting the presence of a payment card at or near the payment card reader.

In one embodiment, the payment card storage apparatus comprises a carousel having a plurality of storage locations for receiving payment cards. The carousel may have identifying features to identify positioning of the carousel relative to the payment card reader.

The payment card storage system may further comprise sensors for detecting the presence of a payment card in a particular storage location.

The transfer mechanism may comprise a first mechanism for moving the payment card past or through the payment card reader and a second mechanism for moving the payment card into the payment card storage apparatus.

Further aspects of the invention will be apparent from the detailed description set forth below.

BRIEF DESCRIPTION OF THE DRAWINGS

The present invention will be readily understood by the following detailed description in conjunction with the accompanying drawings, wherein like reference numerals designate like structural elements.

FIG. 13 is an exemplary default screen for a point-of-sale system tab that includes a payment card storage system according to the invention.

FIG. 14 is an exemplary "Current Order" screen.

FIG. 15 is an exemplary "Current Tab" screen.

FIG. 16 is the screen of FIG. 14 with a prompt to insert a payment card into the payment card storage apparatus.

FIG. 17 is the screen of FIG. 16 after a payment card has been received and read by the payment card storage apparatus FIG. 18 is the "Current Tab" screen following after the screen of FIG. 17.

FIG. 19 is the screen of FIG. 18 with a prompt to remove a payment card from the payment card storage apparatus.

FIG. 20 is the screen following after the screen of FIG. 19, including payment selection prompts.

DETAILED DESCRIPTION OF THE DRAWINGS

The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Figure 1:
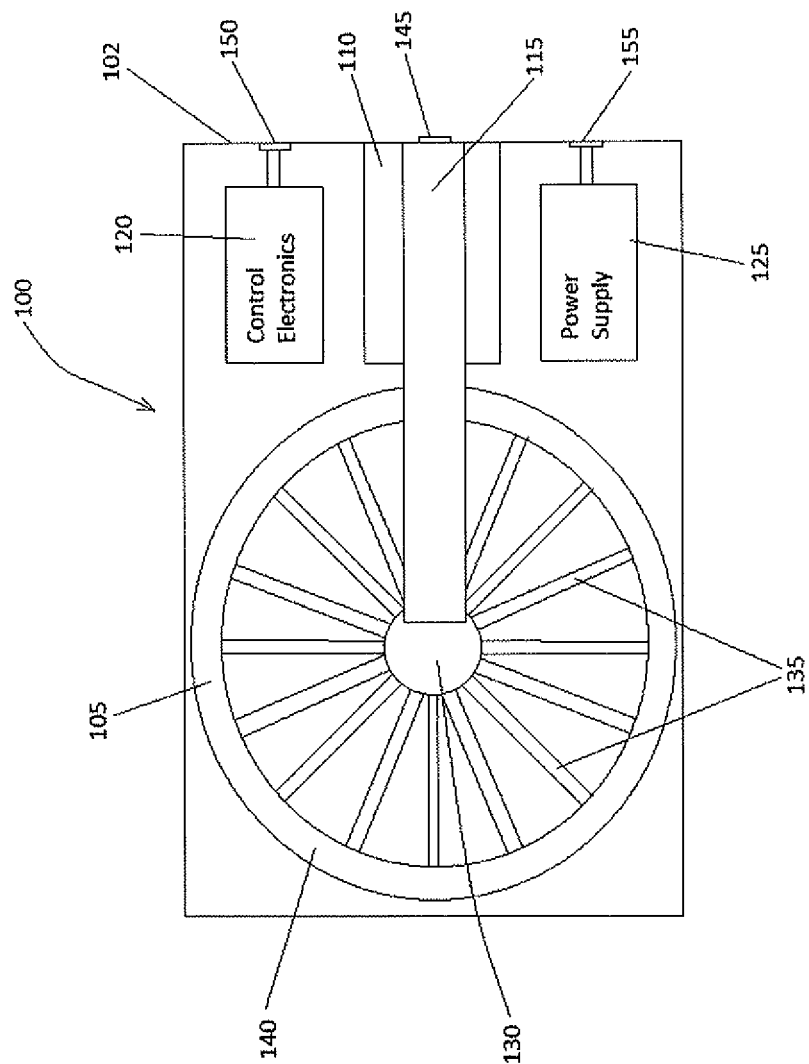
FIG. 1 is a schematic plan view of a payment card storage system according to one aspect of the invention.

A payment card storage system 100 according to a first embodiment of the invention is illustrated schematically in FIG. 1. The system 100 is typically integrated with a point of sale system as discussed in more detail below.

The payment card storage system 100 generally comprises a housing 102, a payment card storage apparatus in the form of a magazine or carousel 105, a payment card reader 110, a transfer mechanism 115, control electronics 120 and a power supply 125.

The carousel 105 comprises a number of slots 135 extending radially from a central hub 130. The slots 135 are sized to receive and retain payment cards while patrons have open tabs. The carousel 105 is driven in a rotary manner about its hub 130 by a motor (not shown in FIG. 1) and any appropriate gearing arrangement. The motor may for example be a stepper motor to provide accurate rotational positioning of the carousel 105 relative to the transfer mechanism 115. The ring 140 may be provided with alignment indicia, apertures or formations that can be detected to permit slot identification and accurate positioning as will be discussed in more detail below.

The card reader 110, as its name implies, is a conventional payment card reading device and includes appropriate magnetic, optical, radio frequency or other transducers to allow the system to read identifying information from a patron's payment card when it is inserted into and/or when it is ejected from the system 100. Payment cards are inserted into or removed from the system via a slot 145 formed in the housing 102.

The transfer mechanism 115 serves to transfer payment cards between the slot 145 and the carousel 105. When a payment card is inserted into the slot 145, the transfer mechanism engages the payment card, moves it through or past the payment card reader 110, and deposits it into a vacant slot 135 in the carousel 105. When a card is to be ejected from the system 100, the carousel is rotated such that the slot 135 containing the particular card is aligned with the transfer mechanism 115, the transfer mechanism engages the card and moves it from the relevant slot 135 to the slot 145, where it can finally be removed by a user of the system. While the transfer mechanism 115 serves both to transfer cards to and from the carousel 105, it will be appreciated that additional mechanism(s) could be provided to eject the card at another location.

The control electronics 120 controls the operation of the system 100, which includes controlling the rotational positioning of the carousel 105 for the receipt and removal of payment cards, controlling the transfer mechanism 115 to move payment cards to and from the carousel 105, and receiving payment card information from the payment card reader 110. The control electronics 120 communicates with an external system, such as a conventional point-of-sale system, via a data port 150 that may utilize any appropriate protocol such as, for example only, USB, RS-232 or one of the IEEE 802 networking standards. The control electronics 120 may alternatively or additionally to the data port 150, be provided with wireless data transmission and/or networking capabilities. Both wired and wireless transmission of data to and from the control electronics 120 may be encrypted to provide additional data security.

The system 100 is powered by the power supply 125, which receives external power via an external power socket 155. The power supply may additionally include a rechargeable battery for fully-functional emergency use, remote use, or to preserve the state of the system 100 in a low power mode in the event of the loss of external power.

As will be appreciated, the division of control responsibilities between the control electronics 120 and the external point of sale system may vary considerably. For example, the control electronics 120 may maintain an index of the full and empty slots 135 in the carousel 105, and, for the slots 135 containing cards, identifying information on each card that has been provided by the card reader 110, as well as information identifying the corresponding tab for each card in each occupied slot (received from the external point of sale system.) In such an example, the external point of sale system need only identify that a particular tab is to be closed out or a particular client's tab is to be closed out and the control electronics can identify the slot 135 containing the relevant card and return it to the slot 145 via the transfer mechanism 115. Alternatively, the association between slots 135, tabs and payment cards can be maintained in the external point of sale system, which then need only instruct the control electronics 120 to return the card in a particular slot. In the extreme case, the control electronics 120 and power supply 125 may be located completely in the external point of sale system, which is then solely responsible for powering and controlling the system 100. In another configuration, the system 100 may be fully integrated within a point of sale system.

The transfer mechanism 115 may comprise a single mechanism for moving a payment card all the way between the slot 145 and one of the slots 135, or may comprise two or more mechanisms that cooperate to accomplish this function. Additionally, one or more passive features may be provided to accomplish one or more transfer functions. For example, a ramped surface or a flexible tab may be provided to seat a payment card fully in a slot 135 when the carousel 105 rotates after the payment card has been received by a slot 135.

Figure 2:
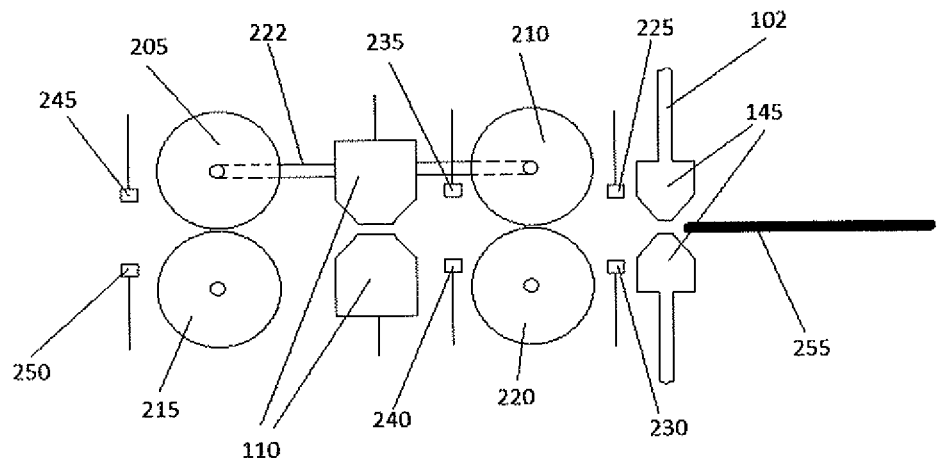
FIG. 2 is a schematic plan view of the card reader and part of the transfer mechanism of the payment card storage system of FIG. 1.
Figure 3:
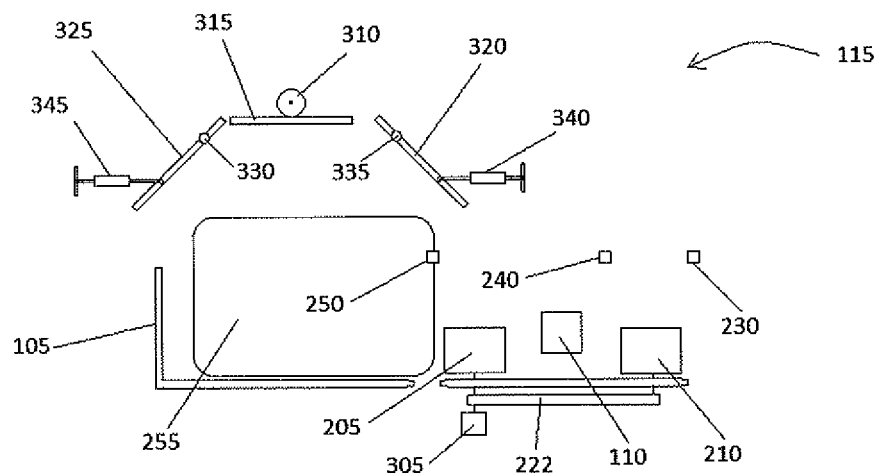
FIG. 3 is a side view of the card reader and transfer mechanism of the payment card storage system of FIGS. 1 and 2.

FIGS. 2 and 3 illustrate an embodiment in which two mechanisms cooperate to move a payment card between the slot 145 and a slot 135.

The part of the transfer mechanism 115 used to move a payment card 255 past the card reader 110 in one exemplary embodiment is show in more detail in FIG. 2. In a system in which the card 255 is inserted upright and end-first into the side of the housing 102, FIG. 2 illustrates part of the transfer mechanism 115 viewed from above and FIG. 3 illustrates the transfer mechanism 115 viewed from the side.

The transfer mechanism 115 illustrated in FIGS. 2 and 3 includes a plurality of rollers 205, 210, 215 and 220 for engaging the card 255 upon insertion or ejection and moving it past the card reader 110. The rollers 205 and 210 are powered, either directly by means of a motor, or indirectly one from the other by means of a drive belt 222 and a drive motor 305 (FIG. 3). The rollers 205 and 210 can rotate in either direction, to move the card 255 into and out of the system 100 as required. The rollers 215 and 220 need not be powered, and cooperate with the rollers 205 and 210 to move the card 255. The roller 215 and 200 may be spring-loaded to provide a predictable pinching force on the card 255.

In order to determine when a card 255 has been inserted into the system 100 via the card insertion slot 145 in the housing 102, one or more detectors may be provided. In the embodiment illustrated in FIG. 2, the detectors comprise one or more sets of LEDs 225, 235, 245 and their corresponding photodetectors 230, 240, 250. The each LED/photodetector pair is arranged so that a card 255 passing the location of the LED/photodetector pair will interrupt the beam of light passing between the LED and the photodetector, thus providing an indication of the presence of a card 255 at that location. The number of LED/photo detector pairs and their locations is a matter of design choice and system configuration. For example, in the configuration shown in FIG. 2, the system will function fully with only the LED 235 and the photodetector 240 just inboard of the rollers 210 and 220. With this configuration, a card being inserted into the system 100 will engage and rotate the idle rollers 210 and 220 against their natural resistance until the card trips the detector pair 235, 240, at which time the rollers will be powered on, thereby to move the card from right to left in the figure past the card reader 110, through the rollers 205, 215 on their way into the carousel 105. After an appropriate amount of time, which will be sufficient to ensure that the card 255 has left the rollers 205, 215, the rollers will be powered down. When a card is being ejected from the system 100, the rollers 205 and 210 are powered on to move the card from left to right in the figure, past the card reader 110 and into engagement with the rollers 210, 220. When the card passes the detector pair 235, 240, the rollers stop rotating, so that the card protrudes from the slot 145 but is still held securely between the rollers 210, 220. A user of the system can then pull the card out of the housing 102 against the natural resistance of the idle rollers 210, 220.

As an alternative, or in addition to the detector pair 235, 240, the detector pair 225, 230 can be provided to signal immediately when a card 255 has been inserted into the slot 145, at which point the rollers can be powered on to move the card further into the system 100. Similarly, the detector pair 225, 230 can be used to power off the rollers when a card that is exiting the system has passed by. When both detector pairs 235, 240 and 225, 230 are provided, they may be used in conjunction with one another. For example, in the scenario described above with respect to the detector pair 235, 240, the detector pair 225, 230 may provide a confirmation that a card 255 has in fact been removed from the housing 102, and if the card has not been removed from the housing 225 within a set amount of time, it may be withdrawn into the housing 102 and replaced in its slot in the carousel 105 or a warning may be displayed via an indicator on the housing 102 or on the display of the point of sale system.

Furthermore, additional detector pairs, such as the detector pair 245, 250 may be provided to give an indication that a card 255 that is being ejected is arriving at the rollers 205, 215, or that a card that has been inserted has left the rollers 205, 215 on the way to the carousel 105. Additionally, sensors at various points can provide diagnostic data in the event of a malfunction, which may permit the system 100 to recover gracefully.

It will be appreciated that various combinations of sensors and locations can be provided, and many different kinds of detectors may be used. For example, mechanical limit switches could be used to detect the presence of a card at any location, and movement of one or more of the rollers (rotational or lateral deflection) can be used to detect the arrival of a card 255 at that roller pair. In yet another embodiment, a detector is not required and a user of the system can signal manually (e.g. on the POS user interface or by pressing a button on the POS or on the housing 102) that a card is about to be inserted. Also, the payment card reader 110 can also function as a detector. For example, if a user signals that a tab is to be opened, the rollers 205/210 can be powered on for a predetermined amount of time. When the payment card reader 110 reads the information from a payment card, the system knows that a card is passing through the roller mechanism and the appropriate next steps can be taken. In the event that no payment card is read, the rollers are powered down and an appropriate message or default screen is displayed on the associated point of sale system's display.

The part of the transfer mechanism 115 illustrated in FIG. 2 will achieve the goal of moving a card between the slot 145 and the card reader 110, but may not reliably deliver the card into a slot 135 in the carousel 105, and will not be able to retrieve a card from the carousel 105, since the rollers 205, 215 would interfere with rotation of the carousel and its stored cards. Accordingly, as shown in FIG. 3, an additional mechanism is provided to move the card 255 between the carousel 105 and the roller pair 205, 215. In FIG. 3, the rollers 215 and 220 have been omitted for clarity.

The additional mechanism comprises a gear 310 that cooperates with a rack 315, and two arms 320, 325. The arms are mounted on pivots 330, 335, which will permit them to move downward in an arc towards the upper corners of the card 255 when it is located in the transfer mechanism 115 as shown generally in FIG. 3. The arms 325 and 330 are biased away from the card 255 by means of springs 340, 345.

When a card 255 is being loaded into the system 100, it will leave the roller pair 205, 215 and may need to be moved further into the carousel 105. At this time, the gear 310 is rotated counterclockwise by a motor (not shown), which causes the rack 315 to move to the right in the figure. The end of the rack 315 will then push the upper end of the arm 320 to the right, causing the lower end of the arm 320 to move downward and to the left against the restoring force of the spring 340 and against the right upper side of the card 255, moving it into position in the cassette 105. At this point, the gear 310 is rotated clockwise to return the rack to a central position, and the arm 320 will move up and away from the card 255 under the influence of the spring 340.

Similarly, when it is desired to eject a card 255 from the carousel 105, the gear 310 is rotated clockwise by the motor, which causes the rack 315 to move to the left in the figure. The end of the rack 315 will then push the upper end of the arm 325 to the left, causing the lower end of the arm 325 to move downward and to the right against the restoring force of the spring 345 against the left upper side of the card 255, moving it to the right until it engages the roller pair 205/215, at which time the card is moved as described above with reference to FIG. 2. At this point, the gear 310 is rotated counterclockwise to return the rack to a central position, and the arm 325 will move up and away from the card 255 under the influence of the spring 345.

Figure 4:
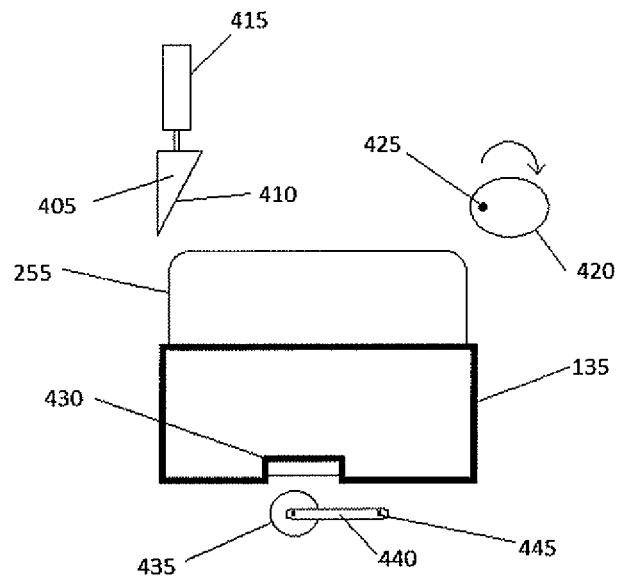
FIG. 4 is a side view of an alternative configuration of part of the transfer mechanism of FIG. 3.

FIG. 4 shows three alternatives to the mechanism of FIG. 3 for seating and/or ejecting the card 255 from the carousel 105.

The first alternative mechanism shown in FIG. 4 is a pad or block 405 coupled to a linear actuator 415. The block 405 includes a ramp 410. The linear actuator 415 can move the block 405 and hence the ramp 410 downwards into engagement with the edge of the card 255, which will in turn move the card 255 to the right, towards and into engagement with the rollers 205, 215.

The second alternative mechanism shown in FIG. 4 is a cam 420 that is rotated about an off-center shaft 425 in a counter-clockwise direction in the illustrated implementation, to engage the edge of the card 255 and move it into the carousel 105.

For purposes of conciseness only one of each of the first two alternative mechanisms are shown (i.e. for either seating or ejecting the card) but they can of course be provided in an opposed mirror-image configuration to provide both seating and ejecting functions.

The third alternative mechanism comprises a powered roller 435 mounted on an arm 440 that can be rotated about a pin 445 to move the roller 435 into a cutout 430 formed in card slot 135, thereby to bring the roller 435 into engagement with the bottom of the card 255. By rotating the roller clockwise the card 255 can be ejected from the slot 135 and by rotating the roller counterclockwise the card 255 can be seated in the slot 135. The roller 435 is then retracted from the cutout 430 by lowering the arm 440, so that the carousel 105 can be rotated without interference.

Figure 5:
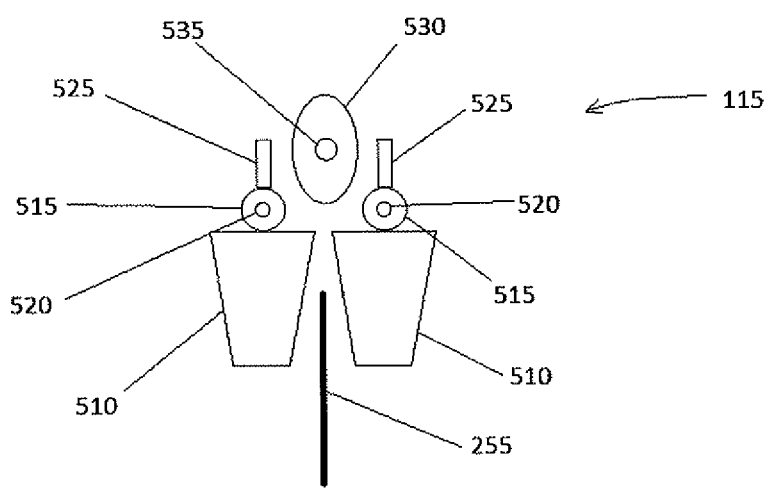
FIG. 5 is an end view of an alternative configuration of a transfer mechanism for use in the system of FIG. 1.
Figure 6:
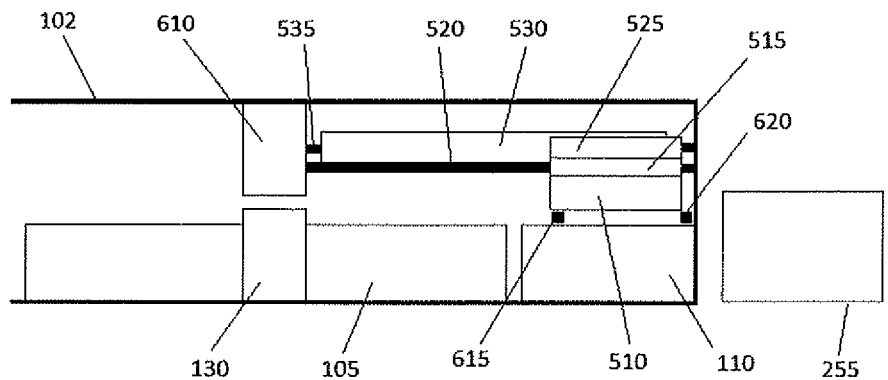
FIG. 6 is a side view of the transfer mechanism of FIG. 5.

FIGS. 5 and 6 show an alternative embodiment of the transfer mechanism 115 in which a single mechanism moves a payment card 255 within the system 100. FIG. 5 is an end view (i.e. in the direction of a card being inserted into the slot 145) of the transfer mechanism 115 while FIG. 6 is a side view of the transfer mechanism 115 of FIG. 5.

In this embodiment, the transfer mechanism 115 includes two rubber pinchers 510 that engage the top sides of a card 255. The pinchers 510 are mounted to threaded sleeves 515 which engage correspondingly threaded rods 520. When the rods 520 are rotated, the sleeves 515 advance or retract, carrying the pinchers 510 with them. Mounted to the top of the sleeves 515 are tabs 525, which are engaged by a cam 530 fixedly mounted to rod 535. When the rod 535 is rotated, the cam 530 engages the tabs 525, which rotate the sleeves 515, thereby to urge the pinchers 510 into engagement with the card 255. At this point, the threaded rods 520 can be rotated to advance or retract the card 255 in a direction out of or into FIG. 5. The rods 520 and rod 515 are rotated by an arrangement of a housing and motors 610 (FIG. 6.) As with the previous embodiment, one or more LED and photodetector pairs 615, 620 can be provided to signal the presence or arrival of the card 255 at one or more locations.

Referring now to FIG. 6, prior to receiving a card 255 that is inserted into the housing 102 or retrieving a card from the carousel 105, the pinchers 510 are positioned away from the carousel 105 and more towards the side of the housing 102 so that the carousel 105 and any cards located therein can rotate unobstructed by the pinchers 510. The cam 530 is disengaged from the tabs 525 as shown in FIG. 5 and the pinchers 510 are thus separated.

When a card 255 is inserted into the housing 102 far enough to trip the LED/photodetector pair 615, the cam 530 is rotated to engage the tabs 525, which in turn rotate the pinchers 510 into engagement with the card 255. With the pinchers now gripping the card 255, the rods 520 are rotated to advance the pinchers 510 (and thus the card 255) towards the carousel 105, which has been positioned so that an empty slot in the carousel 105 is positioned to receive the card 255. When the card is positioned in the slot in the carousel 105, the cam 530 is rotated to disengage from the tabs 525 and the pinchers 510 release the card. The rods 520 are then rotated in the opposite direction to return the pinchers 510 to their original position.

When a card is to be retrieved from the system 100, the carousel 105 is rotated so that the card that is to be removed is aligned with the transfer mechanism 115. The rods 520 are rotated to advance the pinchers 510 towards the carousel 105 until the pinchers 510 are positioned above and on each side of the card 255. The cam 530 is rotated to engage the tabs 525, which in turn rotate the pinchers 510 into engagement with the card 255. With the pinchers now gripping the card 255, the rods 520 are rotated to advance the pinchers 510 (and thus the card 255) towards the card reader 110. As the pinchers 510 reach the card reader, the LED/photodetector pair will first signal that the card 255 has arrived at that location and then that the card 255 has passed that location. At this point the card 255 will protrude slightly from the card insertion slot 145. When the latter signal is received, the rotation of the rods 520 ceases and the cam 530 is rotated out of engagement with the tabs 525, which in turn release the card 255 from the pinchers 510, and the card 255 can be removed from the housing 102.

Figure 7:
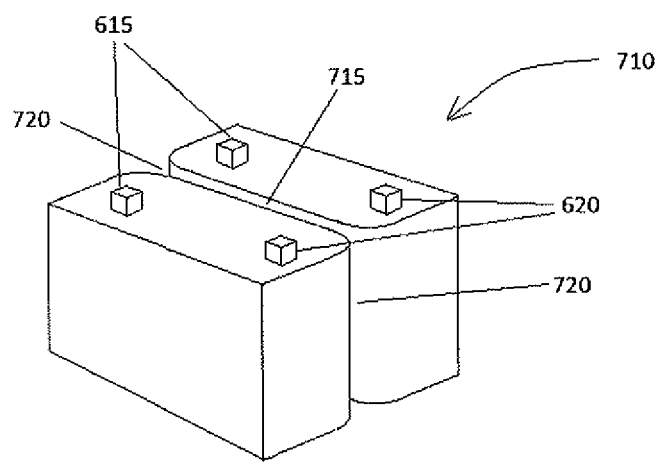
FIG. 7 is a perspective view of a housing arrangement for the card reader and transfer mechanism.

FIG. 7 shows a housing arrangement 710 that may be provided over the card reader 100 and any appropriate part of the transfer mechanism 115, e.g. the rollers illustrated in FIG. 2. The housing arrangement 710 serves as a guide for receiving the card 255 as it passes the card reader 110. The housing arrangement defines a channel 715 with rounded ends 720 to receive and guide the card 255. The housing arrangement 710 also provides a convenient location for mounting detectors, for example the LED/photodetector pairs 615 and 620 of the embodiment illustrated in FIG. 6.

Figure 8:
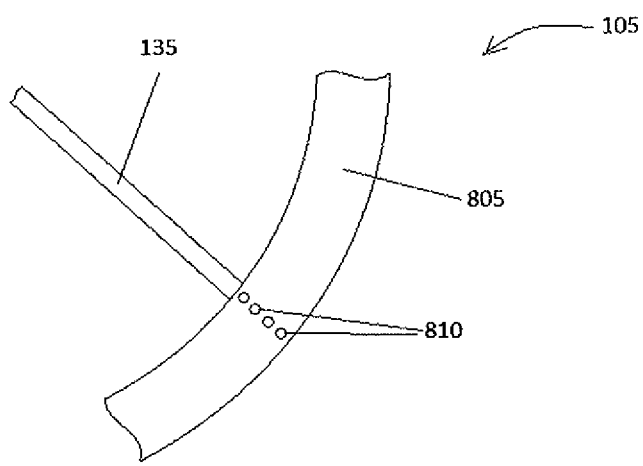
FIG. 8 is a plan view of the edge of a carousel, showing slot identification features.
Figure 9:
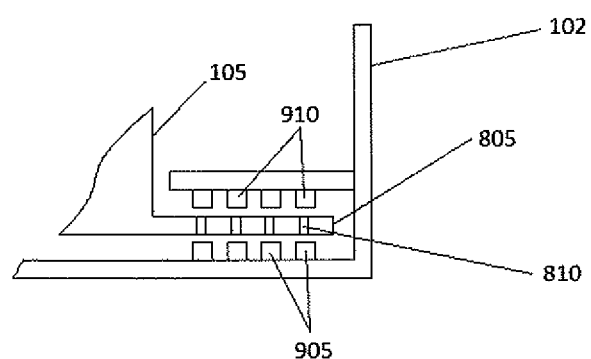
FIG. 9 is a sectional side view of the edge of the carousel of FIG. 8 that includes sensors for reading the slot identification features.

FIGS. 8 and 9 show an embodiment of a slot identification and alignment subsystem that may be provided for the system 100. While the motor (and any appropriate gearing) used to rotate the carousel 105 is preferably sufficiently accurate to move the carousel from a known current slot 135 to a desired slot 135, the subsystem of FIGS. 8 and 9 may provide confirmation of slot positioning and identification at any time and particularly at power on and initialization of the system 100.

As seen in FIG. 8, the carousel 105 may be provided with a circumferential ring 805 at a lower edge of the carousel 105. The ring in FIG. 8 has one or more holes 810 defined therein in one or more known locations, for example corresponding to a particular slot 135. As can be seen in FIG. 9, suitably-positioned photodetectors 905 will be illuminated by opposed LEDs 910 when a particular arrangement of holes 810 is positioned between the photodetectors 905 and LEDs 910. By providing a number of LED and detector pairs, it is possible to identify a number of locations or slots 135 around the carousel 105. For example, the holes 810 at a particular location might correspond to a binary number that identifies a particular slot, with the presence of a hole indicating a binary one and the absence of a hole indicating a binary zero. An arrangement of four LED and detector pairs 905/910 can thus identify 15 locations or slots (0001 to 1111), five pairs can identify 31 locations, and so on. It will be appreciated that the identifying holes 810 for a particular slot 135 need not be located at that slot 135 but could be offset from the slot 135 as long as the relationship is known. That is, the photodetectors 905 and LEDs 910 may be located at 90 or 180 degrees (or some other offset) from the card insertion slot 145, in which case the identifying holes 810 for a particular slot 135 will similarly be offset from the particular slot 135.

It will be appreciated that it may not be necessary to include slot identification and alignment features for each slot 135, since the positioning abilities of the carousel drive motor may be sufficiently accurate to position the carousel 105 appropriately with less such features. This will be accomplished by rotating the carousel 105 by a known amount per slot from a known identification and alignment feature. Such alignment functionality may in fact be provided by a single alignment and identification feature (for example a single hole 805 corresponding to a particular slot 135, e.g. "SLOT 0") and a single detector (e.g. a single LED/photodetector pair 905.) Once the control electronics 120 knows that SLOT 0 is positioned at the card insertion slot, by receiving a positive indication from the single alignment and identification feature, it also knows how much rotation of the carousel motor is required to position every other slot 135 at the card insertion slot 145. Furthermore by keeping track of the particular slot 135 that is positioned at the card insertion slot 145, the control electronics knows how much rotation of the carousel motor is required to position every other slot 135 at the card insertion slot 145. After initialization of the system 100, it may only be necessary to verify or adjust the alignment of the carousel 105 infrequently or even not at all. Since the carousel 105 will periodically be rotating its positioning and alignment feature(s) past the detector(s), the control electronics 120 will constantly be able to verify its understanding of the carousel positioning, should this be required.

It will be appreciated that various types and numbers of sensors and locations can be used to provide slot identification and alignment functionality. For example, a protrusion on the carousel 105 at a particular location(s) can trip mechanical limit switch(es) or be detected by a capacitive, inductive or other sensor.

Figure 10:
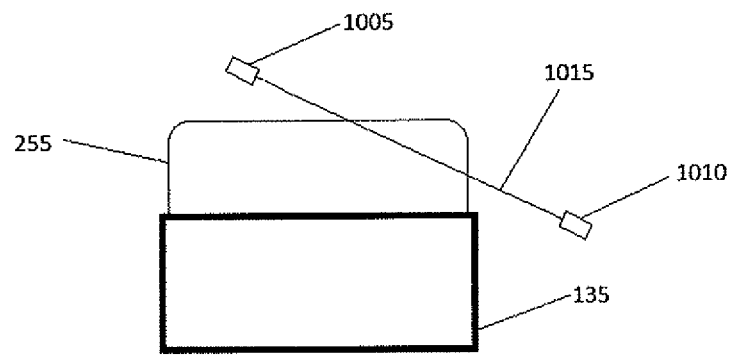
FIG. 10 is a side view of a sensor arrangement for detecting whether or not a payment card is present in a particular slot.
Figure 11:
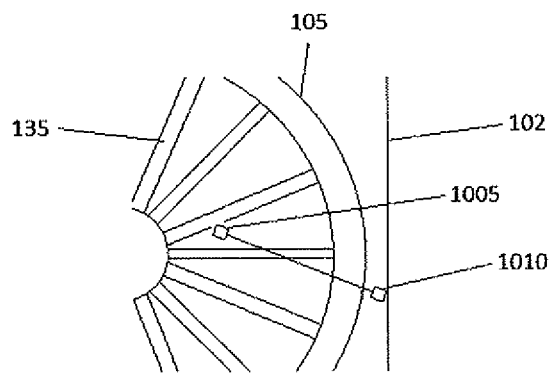
FIG. 11 is a plan view of a sensor arrangement for detecting whether or not a payment card is present in a particular slot.

Additionally, while the control electronics 120 (or associated point of sale system) keeps a record of which slots 135 are occupied by payment cards, it may be desirable (for example on initialization or after a loss of power) to determine or verify which slots are occupied by payment cards. As shown in FIGS. 10 and 11, this can be accomplished by providing an LED 1005 and a photodetector pair 1010 that are arranged such that the beam of light 1015 from the LED is interrupted when there is a card 255 located in a particular slot 135 but that is not interrupted when a card is not present in the slot 135. As shown in FIG. 11, the LED 1005 and photodetector 1010 may be arranged across the slot 135 so that a larger area of the card is present to obstruct the beam of light 1015.

In the arrangement illustrated in FIGS. 10 and 11, the entire carousel 105 may be inventoried by rotating the carousel through 360 degrees so that all the slots pass the LED 1005 and photodetector 1010. Since the control electronics 120 (or associated point of sale system) knows (or can determine as discussed above) the position of each slot 135, the control electronics can determine whether or not the slots 135 contain payment cards 255. In the event that there are unknown cards that are found by this process, they can be ejected, or at a minimum, the system will know not to attempt to load a card into the identified slots.

The transfer mechanism 115 can also be used to inventory the contents of the carousel 105. For example, using the embodiment of the transfer mechanism 115 illustrated in FIGS. 2 and 3, the carousel can be rotated to each slot 135 and the gear 310 rotated counter-clockwise to cause the arm 325 to move the card (if any) towards the LED 245 and photodetector 250. If no card 255 is detected, the particular slot 135 is marked as empty, the arm 325 returns to its default position and the carousel 105 is advanced to the next slot 135.

If a card 255 is detected by the LED 245 and photodetector 250, the particular slot 135 can be marked as full and the card 255 returned to the slot by means of the arm 320. Alternatively, the rollers 205, 215, 210, 220 can be rotated to move the card 255 past the card reader 110, which permits the system 100 to not only mark the slot 135 as full, but also to read the identifying information off the card 255. Once the card 255 has been identified, the rollers 205, 215, 210, 220 can be reversed and the card 255 returned to the slot 135 in the same manner as during initial loading.

Since utilizing the transfer mechanism to check each slot 135 may be time consuming, the arrangement illustrated in FIGS. 10 and 11 may be used to identify which slots 135 contain cards 255, at which point the transfer mechanism 115 can be used to read identifying information from the cards 255 in the slots 135 that have been identified as containing cards 255.

Figure 12:
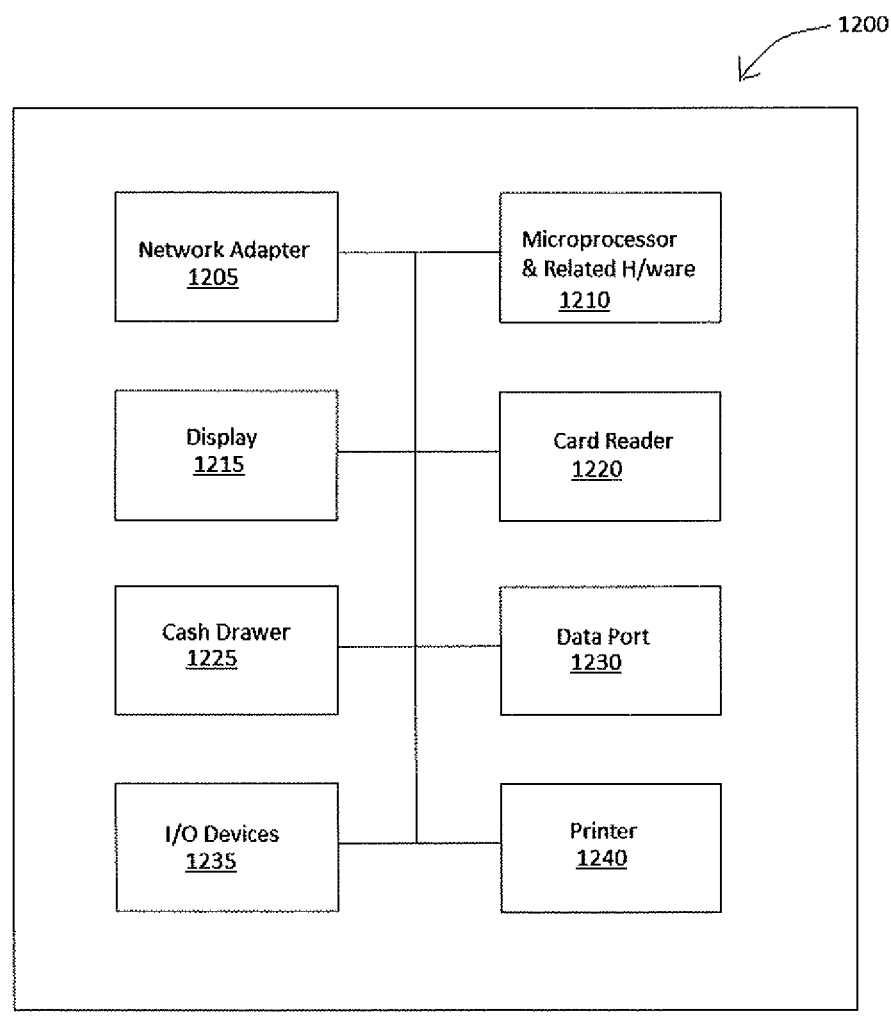
FIG. 12 is a schematic diagram of a point-of-sale system.

The payment card storage system 100 may be associated with or integrated with a point of sale (POS) system. An exemplary point of sale system 1200 is illustrated in FIG. 12. The POS system 1200 includes a wired or wireless network adapter 1205, a microprocesser and related hardware 1210, a display 1215, a card reader 1220, a cash drawer 1225, a data port 1230, input output devices 1235 and a printer 1240.

Since the POS system 1200 is based on the architecture of a personal computer, the microprocessor and related hardware (e.g. random-access memory, a system bus, mass storage device, power supply etc.) is conventional in nature and for purposes of clarity will not be discussed here.

The wired or wireless network adapter 1205 permits networking of the POS system 1200 to local and wide-area networks for the purposes of payment card authorization and transaction processing, accounting purposes, and for transmitting food orders for processing by kitchen staff if the venue serves food. The network adapter may also be used to communicate with the payment card storage system 100.

The display 1215, which is typically a touch screen, is used by staff members to input orders from customers, submit them to the kitchen (if appropriate), and receive and process payments. The payment card reader 1220 is used for reading payment card information and may be integrated with the display 1215. The cash drawer 1225 is provided to receive cash payments.

The data port 1230 (e.g. USB, RS 232, Firewire, Thunderbolt or other suitable protocol) may be used to connect the POS system 1200 to the payment card storage system 100 if the two are not integrated, or if the two are not networked using the network adapter 1205. The printer 1240 is used for printing payment card receipts for customer signature. Other I/O devices 1235 such as a mouse, keyboard or a customer signature pad are provided as needed or desired.

The operation of the POS system 1200 is largely conventional in nature, and includes ordering and payment user interfaces and methods as are known in the point of sale art. For example, the POS system may include (depending on the nature of the establishment) the kinds of user interfaces and order processing methods discussed in U.S. Pat. No. 5,602, 730 to Coleman et al and U.S. Pat. No. 5,262,938 to Rapoport et al, the disclosures of which are included herein by reference. For purposes of clarity and conciseness, not all of the typical or optional features or operation of a conventional point of sale system are going to be set forth here. Rather, the modifications to a POS system and its operation in the context of the payment card storage system 100 have been or will be discussed.

FIG. 13 shows an exemplary default screen shown on the display 1215. The default screen includes three columns, a list of tabs 1305, the current order 1310 and menu items 1315. The list of tabs is arranged alphabetically by customer name and includes an A-Z column to its left that will start the list at the first customer name starting with the selected letter, which may be convenient to the server in the event that a large number of tabs are open.

As the name suggests, the current order column 1310 is used to display the current order in subsequent screens, but in the default screen it prompts the user to either select an item from the menu items to start a new order, or to select a tab to add to or cash out that tab. The menu items column 1315 includes a number of order categories that will pop up a list of items under that category if selected, permitting the server to select individual items to be added to a particular tab.

If the server starts a new order by selecting menu items, the order is assigned a new order number and the display on the screen transitions to FIG. 14, which illustrates a current order in progress. The server can add items by selecting further categories and items from the menu items 1315, delete items by touching the X marks next to individual items, or can change the number of items by touching the current number of items, which will pop up a list of numbers for selection.

Typically, when the customer has finished ordering items, the server will ask "do you want to pay now or start a tab?" or "should I add this to your tab?" Using the selections at the bottom of the current order column, the server can then start a new tab, add to an existing tab or accept payment from the customer. If the customer wishes to pay, the server selects "Submit and pay," which submits the order to the kitchen (if appropriate) and the server then proceeds to accept payment by cash or a payment card in a conventional manner. If the server selects "Add to open tab," then the list of tabs is highlighted or popped forward and user can then select an existing tab to which to add the additional items, with an option to confirm or cancel the selection in case the wrong name is selected. The entire tab will then be displayed (as shown for example in FIG. 15) and the server can then select "Done" to return to the default screen or "Cash Out" to close out the tab and receive payment. As can be seen, the name under which the tab is open is highlighted in the list of open tabs 1305 and is shown at the top of the central column, which has been renamed "Current Tab." When the server selects "Done," any new items not previously submitted to the kitchen (if appropriate) are now submitted to the kitchen and the screen returns to the default screen shown in FIG. 13. Also, once orders are submitted (by selecting "Submit and Pay" in FIG. 14 or "Done" in FIG. 15), the system may prevent them from being deleted by the server without managerial authorization. See for example in FIG. 15, where the first two items were ordered earlier by customer Jane Jones.

If the customer chooses to start a tab, the server asks for a payment card to hold to secure the tab and then selects "Start New Tab" in FIG. 14. The display screen then prompts the server to "Insert Payment Card into Tab Management System" as shown in FIG. 16. The server then inserts the payment card 255 into the card insertion slot 145 in the payment card storage system. The transfer mechanism 115 then engages the card 255 and moves it past the payment card reader 110 into an empty slot 135 that has been aligned with the transfer mechanism 115 in anticipation of the insertion of a card. The number of the slot 135 and identifying information read from the payment card 255 by the card reader 110 are then associated with the order number, which may be done by the control electronics 120 or the POS system 1200.

Optionally, the POS system or control electronics 120 may also verify with the company that issued the payment card whether it is a valid card, not lost or stolen, with sufficient credit or funds to cover the expected charge, or some increased figure. If the payment card is rejected for some reason, the display screen will display this fact (optionally including the reason,) reverse the transfer mechanism 115 to return the card to the card insertion slot 145, and prompt the server to remove the card from the payment card storage system 100. After the server has removed the card, the screen returns to the Current Order screen shown in FIG. 14 with its associated options for proceeding.

The identifying information read from the card typically includes the card-holder's name. If the card is authorized (or no credit or debit authorization is performed), the card-holder's name is displayed on the display screen with a prompt to the user to "Confirm" or "Return Card" as shown in FIG. 17. This optional check permits the server to verify that the correct card has been received. If the user selects "Confirm," then the display screen returns to the default screen of FIG. 13 and the carousel 105 is rotated so that an unoccupied slot 135 is aligned with the transfer mechanism 115 in anticipation of receiving a further card. The display screen then shows the tab that has been opened in the new name as shown in FIG. 18, in which the card holder's name is shown in the central column and the list of open tabs 1305 has been updated by adding the name of the new tab-holder at the appropriate alphabetical location in the list. At this point, the server can add further items or select "Done," which submits any order to the kitchen (as appropriate) and returns to the default screen of FIG. 14.

If the server selects "Return Card" in FIG. 17 then the transfer mechanism 115 is reversed to return the card to the card insertion slot 145 as outlined above and the display screen prompts the server to remove the card from the payment card storage system 100. After the server has removed the card, the screen returns to the Current Order screen shown in FIG. 14 with its associated options for proceeding.

If the server selects the "Cash Out" option in a tab screen (e.g. FIG. 15 or FIG. 18), the carousel 105 is rotated so that the slot 135 containing the payment card corresponding to the selected tab is aligned with the transfer mechanism 115, and the transfer mechanism 115 then moves the card from the slot 135 to the card insertion slot 145 so that it protrudes from the card insertion slot 145 and can be removed by the server. Identifying information may be read from the card by the payment card reader, but this may not be necessary as the card was read upon insertion. The server is then prompted by the display screen to "Remove Card from Tab Management System" as shown in FIG. 19. If the server presses cancel, or the card is not removed within a predetermined time, the card is returned to its slot and the display reverts to the tab display (e.g. FIG. 15 or 18.)

When the card is removed, the display screen prompts the server to select the payment method as shown in FIG. 20. Since the customer may want to pay with cash or a different payment card, the display screen prompts the server to "Pay with Tab Card," "Pay with Another Card" or "Pay with Cash." If the server selects "Pay with Cash" or "Pay with Another Card," then the POS system 1200 is used by the server to process payment in a conventional manner. In the case of "Pay with Another Card," it will be necessary for the server to pass the card through the card reader 1220 associated with the POS system 1200. If the server selects "Pay with Tab Card," then the POS system 1200 is used by the server to process payment in a conventional manner, with the exception that it is not necessary for the server to pass the card through the card reader 1220 since the card information has already been read by the card reader 110 in the payment card storage system 100.

While the invention has been illuminated in the detailed description of exemplary embodiments to refer to a tab payment system in a bar or restaurant, it will be noted that the invention may be applied in any situation in which a debt or obligation can be secured by the possession of a personally-identifiable token that has, holds or permits access to value. For example, a driver's license, which has personal value to its owner, may be used to secure an item that has been loaned to the holder of a driver's license.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

We claim:

1. A payment card storage system, comprising:
   a payment card storage apparatus to receive and store payment cards under computer control, the payment card storage appartus including a plurality of storage locations for receiving and storing payment cards;
   a payment card reader to read identifying information from the payment cards that are to be stored by the payment card storage apparatus; and
   a transfer mechanism to transfer a particular payment card to and from a specific storage location within the plurality of storage locations.

2. The payment card storage system of claim 1 wherein the payment card reader is co-located with the payment card storage apparatus and the transfer mechanism moves the payment cards past or through the payment card reader.

3. The payment card storage system of claim 1 further Comprising a computer processor to execute instructions for operating the payment card storage system and a display to present transaction information to a user of the system.

4. The payment card storage system of claim 3 wherein, in use, the transaction information shown by the display includes a user-selectable option of starting a tab mid storing a specific payment card in the payment card storage apparatus.

5. The payment card storage system of claim 4 wherein, alter selection of the option to store the specific payment card in me payment card storage apparatus, identifying information is read from the specific payment card by the card reader apparatus and the specific payment card is associated with a list of one or more specific items ordered by a specific patron.

6. The payment card storage system of claim 5 wherein the identifying information read from the specific payment card includes the name of the specific patron, which is shown on the display when the specific patrons list of items is displayed by the display.

7. The payment card storage system of claim 6 wherein a user of the system can select to return the specific payment card or add more items to the when the list of items is displayed by the display.

8. The payment card storage system of claim 5 wherein the identifying information read from the specific payment card includes the name of the specific patron, and the system displays a list or index of names of the patrons whose cards are stored in the payment card storage system.

9. The payment card storage system of claim 1 further comprising one or more sensors for detecting the presence of a payment card at or near the payment card reader.

10. The payment card storage system of claim 1 wherein the payment card storage apparatus comprises a carousel having a plurality of storage locations for receiving payment cards.

11. The payment card storage system of claim 10 wherein the carousel has identifying features to identity positioning of the carousel relative to the payment card reader.

12. The payment card storage system of claim 10 further comprising sensors for detecting the presence of a payment card in a particular storage location.

13. The payment card storage system of claim 1 wherein the transfer mechanism comprises a first mechanism for moving the payment card past or through the payment card reader and a second mechanism for moving the payment card into the payment card storage apparatus.

14. A system for storing and retrieving a personally-identifiable token that has value to the holder of the token, comprising:
   a token storage apparatus to receive and store tokens under computer control, the token storage apparatus including a plurality of storage locations for receiving and storing tokens;
   a token reader to read identifying information from the tokens that are to be stored by the token storage apparatus; and
   a transfer mechanism to transfer a particular payment card to and from a specific storage location within the plurality of storage locations.

15. The token storage system of claim 14 wherein the token reader is co-located with the token storage apparatus and the transfer mechanism moves the tokens past or through the token reader.

16. The token storage system of claim 14 further comprising a computer processor to execute instructions for operating a point of sale system and a display to present transaction information to a user of the system.

17. she token storage system of claim 16 wherein, in use, the transaction information shown by the display includes a user-selectable option of starting a tab and storing a specific token in the token storage apparatus.

18. The token storage system of claim 17 wherein, after selection of the option to store the specific token in the token storage apparatus, identifying information is read from the specific token by the token reader apparatus and the specific token is associated with a list of one or more specific items ordered by a specific patron.

* * * * *